(12) United States Patent
Pasku et al.

(10) Patent No.: US 11,424,769 B2
(45) Date of Patent: Aug. 23, 2022

(54) RADIO FREQUENCY FILTERING CIRCUITRY WITH REDUCED FILTER SET

(71) Applicant: Qorvo US, Inc., Greensboro, NC (US)

(72) Inventors: Valter Pasku, Munich (DE); Erika Meniconi, Munich (DE); Christian Bildl, Munich (DE); Tatyana Purtova, Munich (DE); Marco Virili, Munich (DE)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 17/186,758

(22) Filed: Feb. 26, 2021

(65) Prior Publication Data
US 2022/0069849 A1 Mar. 3, 2022

Related U.S. Application Data

(60) Provisional application No. 63/071,389, filed on Aug. 28, 2020.

(51) Int. Cl.
*H04B 1/00* (2006.01)
*H04B 1/16* (2006.01)
*H04B 1/04* (2006.01)

(52) U.S. Cl.
CPC ............ *H04B 1/0078* (2013.01); *H04B 1/04* (2013.01); *H04B 1/1615* (2013.01); *H04B 2001/0408* (2013.01)

(58) Field of Classification Search
CPC ...... H04B 1/0057; H04B 1/006; H04B 1/525; H04B 1/48; H04B 1/18; H04B 2001/0408;

(Continued)

(56) References Cited

U.S. PATENT DOCUMENTS

2018/0019768 A1\* 1/2018 King ................... H04L 27/0002
2019/0013790 A1\* 1/2019 Ayranci .............. H03H 7/0161
(Continued)

OTHER PUBLICATIONS

Balteanu, F., "RF Front End Module Architectures for 5G," 2019 IEEE BiCMOS and Compound Semiconductor Integrated Circuits and Technology Symposium (BCICTS), Nov. 3-6, 2019, Nashville, TN, USA, IEEE, 8 pages.
(Continued)

*Primary Examiner* — Golam Sorowar
(74) *Attorney, Agent, or Firm* — Withrow & Terranova, P.L.L.C.

(57) ABSTRACT

A radio frequency (RF) front end module includes an antenna node, a number of RF filtering elements and switching circuitry. Each one of the RF filtering elements is configured to pass RF signals within a filter pass band and attenuate RF signals outside the filter pass band. The switching circuitry is configured to selectively couple one or more of the RF filtering elements to the antenna node such that RF signals in different operating bands received at the antenna node are separately isolated by the RF filtering elements. The RF filtering elements include a shared filtering element, which is switchable such that in a first operating configuration is used to isolate signals within a first operating band and in a second operating configuration is used to isolate signals within a second operating band that is different from the first operating band.

20 Claims, 8 Drawing Sheets

(58) Field of Classification Search
CPC .. H04B 7/0413; H04B 1/0064; H04B 7/0617;
H04B 7/0602; H04B 7/04; H04B 1/04;
H04B 1/38; H04B 7/0868; H04B 1/0067;
H04B 1/0458; H04B 1/40; H04B 7/0802;
H04B 7/12; H04B 7/15535; H04L 5/001;
H04L 5/14; H04L 5/1461; H04L 5/0023;
H04L 25/00; H04L 5/0028; H04L 1/0003;
H04L 1/0009; H04L 1/1607; H04L
2025/03414; H04L 25/03019; H04L
27/0002; H04L 27/01; H04L 27/2636;
H04L 27/265; H04L 27/2678; H04L
5/0007; H04L 5/0048; H04L 1/0054;
H04L 25/03171; H01Q 5/50; H01Q
1/523; H01Q 1/246; H01Q 21/061; H01Q
21/24; H01Q 21/29; H01Q 25/00; H01Q
25/005; H01Q 3/24; H01Q 1/243; H01Q
1/525; H01Q 1/526; H01Q 21/205; H01Q
1/242; H01Q 3/2605; H01Q 3/2658;
H01Q 3/36; H01Q 5/335; H03H 9/725;
H03H 9/64; H03H 9/25; H03H 9/70;
H03H 9/706; H03H 2007/013; H03H
7/0115; H03H 7/463; H03H 9/6483;
H03H 7/09; H03H 9/542; H03H 9/605;
H03H 9/703; H03H 9/72; H03H 11/30;
H03H 11/344; H03H 7/40; H03H 7/465;
H03H 7/48; H03H 9/02007
See application file for complete search history.

(56) References Cited

U.S. PATENT DOCUMENTS

2021/0013910 A1* 1/2021 Ono ..................... H04B 1/04
2021/0218434 A1* 7/2021 Pehlke .................. H04L 5/14

OTHER PUBLICATIONS

Hagelauer, G. et al., "Microwave Acoustic Wave Devices: Recent Advances on Architectures, Modeling, Materials, and Packaging," IEEE Transactions on Microwave Theory and Techniques, vol. 66, No. 10, Oct. 2018, IEEE, pp. 4548-4562.

Li, M. et al., "A Fully Matched LTE—A Carrier Aggregation Quadplexer Based on BAW and SAW Technologies," 2014 IEEE International Ultrasonics Symposium, Sep. 3-6, 2014, Chicago, IL, IEEE, pp. 77-80.

Takai, T. et al., "Investigations on design technologies for SAW quadplexer with narrow duplex gap," 2016 IEEE MTT-S International Microwave Symposium (IMS), May 22-27, 2016, San Francisco, CA, IEEE, 4 pages.

* cited by examiner

RADIO FREQUENCY FILTERING CIRCUITRY WITH REDUCED FILTER SET

RELATED APPLICATIONS

This application claims the benefit of provisional patent application Ser. No. 63/071,389, filed Aug. 28, 2020, the disclosure of which is hereby incorporated herein by reference in its entirety.

FIELD OF THE DISCLOSURE

The present disclosure is related to radio frequency (RF) filtering circuitry, and in particular to RF filtering circuitry with a reduced number of filters.

BACKGROUND

Radio frequency (RF) filtering circuitry is integrated with switching circuitry and matching circuitry to form an RF front end module. Generally, RF filtering circuitry includes a dedicated filter element such as a surface acoustic wave (SAW) filter, a bulk acoustic wave (BAW) filter, or the like, for each operating band the RF front end module is capable of servicing. Each filtering element may be a separate die, or may consume additional area on the same die as one or more other filtering elements. This results in a large area for a particular solution. Further, filtering elements having the same function (i.e., filtering the same frequency band) may be duplicated to allow for easier matching of impedances between different groups of filtering elements as they are coupled together by the switching circuitry at an antenna node. The result is RF filtering circuitry that is relatively large. While there is a constant desire for smaller RF front end modules, there is also a desire for RF front end modules that service more and more operating bands. Accordingly, there is a need for an RF front end module capable of servicing a large number of operating bands with a reduced size.

SUMMARY

In one embodiment, a radio frequency (RF) front end module includes an antenna node, a number of RF filtering elements and switching circuitry. Each one of the filtering elements is configured to pass radio frequency signals within a filter pass band and attenuate radio frequency signals outside the filter pass band. The switching circuitry is configured to selectively couple one or more of the RF filtering elements to the antenna node such that radio frequency signals in different operating bands at the antenna node are separately isolated by the RF filtering elements. The RF filtering elements include a shared filtering element, which in a first operating configuration is coupled to the antenna node and used to isolate signals within a first operating band and in a second operating configuration is coupled to the antenna node and used to isolate signals within a second operating band that is different from the first operating band. By using a shared RF filtering element, the number of RF filtering elements in the RF front end module can be reduced while maintaining the functionality thereof.

In one embodiment, a method includes coupling a first set of RF filtering elements to an antenna node in a first operating configuration and coupling a second set of RF filtering elements to the antenna node in a second operating configuration. The first set of RF filtering elements and the second set of RF filtering elements include a shared RF filtering element, which is configured to pass radio frequency signals within a shared filter pass band from the antenna node to a first input/output node and attenuate RF signals outside the shared filter pass band. In the first operating configuration, the shared RF filtering element is coupled to the antenna node such that RF signals within the first operating band are passed between the antenna node and the first input-output node. In the second operating configuration, the shared RF filtering element is coupled to the antenna node such that RF signals within the second operating band are passed between the antenna node and the first input-output node.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
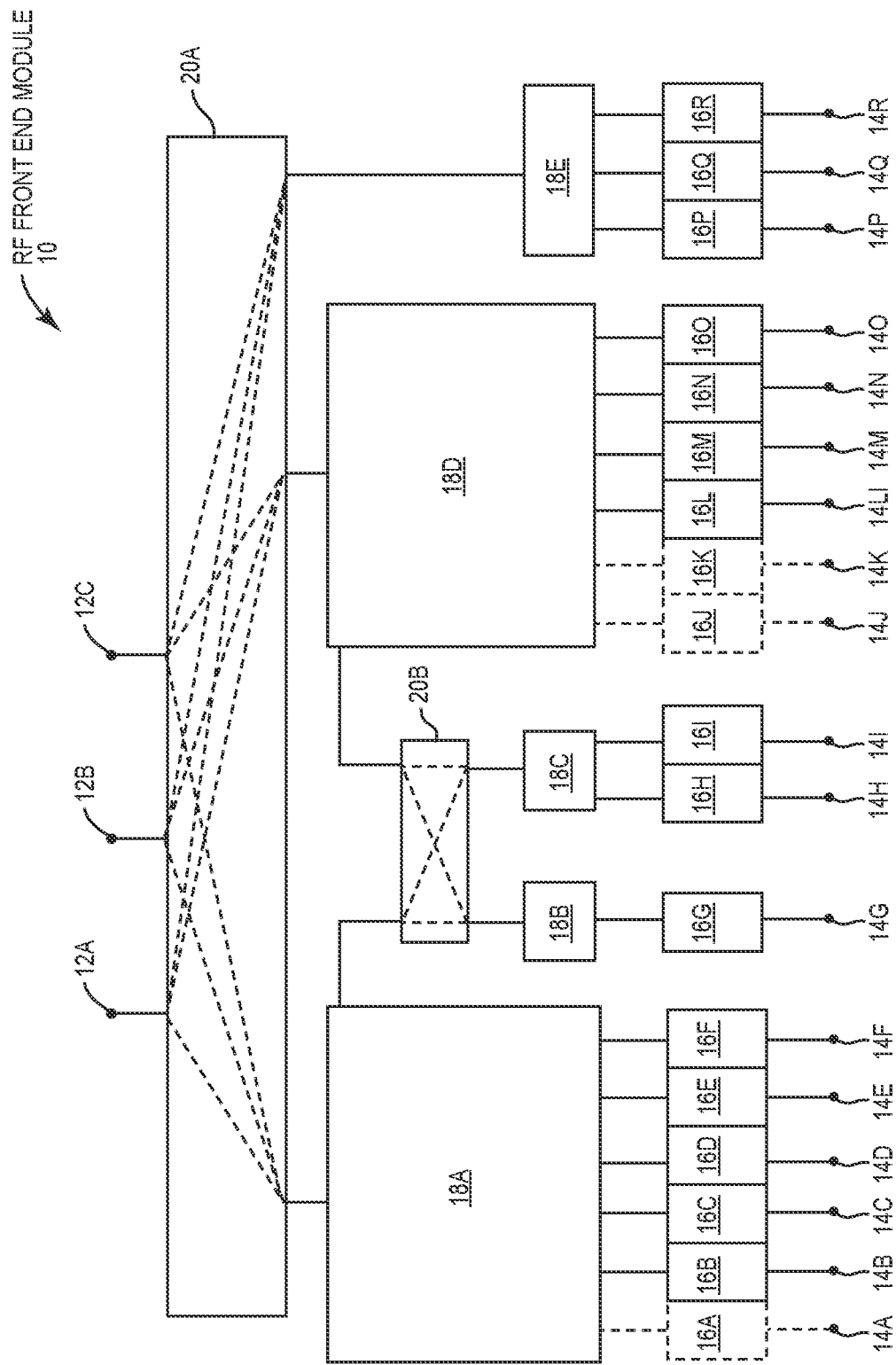
FIG. 1 is a functional schematic illustrating a radio frequency (RF) front end module.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

FIG. 1 shows a simplified schematic of a radio frequency (RF) front end module 10. The RF front end module 10 includes a number of antenna nodes 12, a number of input/output (IO) nodes 14, a plurality of RF filtering elements 16, matching circuitry 18, and switching circuitry 20. A first RF filtering element 16A is coupled between a first IO node 14A and first matching circuitry 18A. A second RF filtering element 16B is coupled between a second IO node 14B and the first matching circuitry 18A. A third RF filtering element 16C is coupled between a third IO node 14C and the first matching circuitry 18A. A fourth RF filtering element 16D is coupled between a fourth IO node 14D and the first matching circuitry 18A. A fifth RF filtering element 16E is coupled between a fifth IO node 14E and the first matching circuitry 18A. A sixth RF filtering element 16F is coupled between a sixth IO node 14F and the first matching circuitry 18A. A seventh RF filtering element 16G is coupled between a seventh IO node 14G and second matching circuitry 18B. An eighth RF filtering element 16H is coupled between an eighth IO node 14H and third matching circuitry 18C. A ninth RF filtering element 16I is coupled between a ninth IO node 14I and the third matching circuitry 18C. A tenth RF filtering element 16J is coupled between a tenth IO node 14J and fourth matching circuitry 18D. An eleventh RF filtering element 16K is coupled between an eleventh IO node 14K and the fourth matching circuitry 18D. A twelfth RF filtering element 16L is coupled between a twelfth IO node 14L and the fourth matching circuitry 18D. A thirteenth RF filtering element 16M is coupled between a thirteenth IO node 14M and the fourth matching circuitry 18D. A fourteenth RF filtering element 16N is coupled between a fourteenth IO node 14N and the fourth matching circuitry 18D. A fifteenth RF filtering element 16O is coupled between a fifteenth IO node 15O and the fourth matching circuitry 18D. A sixteenth RF filtering element 16P is coupled between a sixteenth IO node 14P and fifth matching circuitry 18E. A seventeenth RF filtering element 16Q is coupled between a seventeenth IO node 14Q and the fifth matching circuitry 18E. An eighteenth RF filtering element 16R is coupled between an eighteenth RF filtering element 14R and the fifth matching circuitry 18E. The first matching circuitry 18A, the fourth matching circuitry 18D, and the fifth matching circuitry 18E are coupled to first switching circuitry 20A and the second switching circuitry 20B. The second matching circuitry 18B and the third matching circuitry 18C are coupled to the first switching circuitry 20A via second switching circuitry 20B. A first antenna node 12A, a second antenna node 12B, and a third antenna node 12C are coupled to the first switching circuitry 20A such that the first switching circuitry 20A is between the antenna nodes 12 and the matching circuitry 18. While only three antenna nodes 12 are shown in the examples discussed herein, any number of antenna nodes 12 may be present without departing from the principles of the present disclosure.

In operation, each one of the RF filtering elements 16 is configured to pass signals within a filter pass band between the nodes coupled thereto while attenuating signals outside of the filter pass band. Each one of the RF filtering elements 16 may have a different filter pass band, however, some of the RF filtering elements 16 may share a filter pass band in some situations. The matching circuitry 18 is configured to match impedances from each one of the RF filtering elements 16 coupled thereto such that each one of the RF filtering elements 16 can provide the filtering functionality discussed above. The switching circuitry 20 is configured to selectively couple various ones of the matching circuitry 18, and thus the RF filtering elements 16 to different ones of the antenna nodes 12 in order to simultaneously transmit and/or receive signals within one or more operating bands. In particular, signals within different operating bands received at one or more of the antenna nodes 12 are isolated by the coupled RF filtering elements 16 and separately provided to different ones of the IO nodes 14. Similarly, signals within different operating bands provided at different ones of the IO nodes 14 are combined and passed to one or more of the antenna nodes 12 for transmission. As defined herein, an operating band is a portion of RF spectrum allocated by a wireless standard for communications. For example, in long term evolution (LTE) communications networks, various combinations of operating bands 1 through 88 may be used for the transmission and/or reception from a wireless device. Notably, LTE operating bands are only one exemplary set of RF frequency bands that may be used according to the principles of the present disclosure. While the primary examples given herein are for a certain set of LTE operating bands, the principles of the present disclosure apply equally to any additional LTE operating bands that are known or may be codified in future standards, to fifth generation (5G) operating bands, or to any other operating bands used in any known or future wireless standards. When two or more operating bands are simultaneously used to transmit information or to receive information, the wireless device is said to be operating in a carrier aggregation mode of operation. The switching circuitry 20 and thus the RF front end module 10 can operate in a number of operating configurations wherein certain ones of the RF filtering elements 16 are coupled to one or more of the antenna nodes 12 in order to simultaneously transmit and/or receive signals within certain combinations of operating bands. The dashed lines within the first switching circuitry 20A and the second switching circuitry 20B illustrate the permitted operating configurations of the RF front end module 10, which are the connections that the first switching circuitry 20A and the second switching circuitry 20B are capable of making between the connections thereto.

Table 1 shows an exemplary configuration for the RF filtering elements 16 of the RF front end module 10. In particular, Table 1 shows the LTE operating band serviced by each one of the RF filtering elements 16 and the corresponding filter pass band:

TABLE 1

| RF filtering element | LTE Operating Band | Filter Pass Band (MHz) |
| --- | --- | --- |
| 16A | 32R | 1452-1496 |
| 16B | 1T | 1920-1980 |
| 16C | 1R | 2110-2170 |
| 16D | 3T | 1710-1785 |
| 16E | 3R | 1805-1880 |
| 16F | 40TR | 2300-2400 |
| 16G | 41TR | 2496-2690 |
| 16H | 7T | 2500-2570 |
| 16I | 7R | 2620-2690 |

TABLE 1-continued

| RF filtering element | LTE Operating Band | Filter Pass Band (MHz) |
| --- | --- | --- |
| 16J | 30T | 2305-2315 |
| 16K | 30R | 2350-2360 |
| 16L | 25T | 1850-1915 |
| 16M | 25R | 1930-1995 |
| 16N | 66T | 1710-1780 |
| 16O | 66R | 2110-2200 |
| 16P | 41TR | 2496-2690 |
| 16Q | 34TR | 2010-2025 |
| 16R | 39TR | 1880-1920 |

Those skilled in the art will appreciate that the LTE operating band is designated by a number designating a band and a T for transmit, R for receive, or TR for transmit/receive (in the case of time division duplexing (TDD) operating bands). The configuration of the RF front end module 10 allows for carrier aggregation of bands 1, 3, and 41 (B1-B3-B41), bands 1, 3, and 7 (B1-B3-B7), bands 25, 66, and 41 (B25-B66-B41), bands 25, 66, and 7 (B25-B66-B7), bands 1, 3, and 40 (B1-B3-B40), bands 1, 3, 7, and 32 (B1-B3-B7-B32), and bands 7 and 40 (B7-B40) in different operating configurations. Notably, this list of carrier aggregation configurations is not exhaustive and the RF front end module 10 may allow for additional carrier aggregation configurations not mentioned above. The RF front end module 10 requires a relatively large number of RF filtering elements 16 to do so. As discussed above, each one of the RF filtering elements 16 may be implemented on a separate die, or combined on a single die wherein each one of the has independent inputs and outputs. For example, each one of the RF filtering elements 16 may be a bulk acoustic wave (BAW) device, a surface acoustic wave (SAW) device, or the like, implemented on a discrete acoustic die. Accordingly, the number of RF filtering elements 16 in the RF front end module 10 is proportional to the size thereof.

A careful review of the RF filtering elements 16 shows that B3T (1710-1785 MHz) is a superset of B66T (1710-1780 MHz). Similarly, B66R (2110-2200 MHz) is a superset of B1R (2110-2170 MHz). To take advantage of this fact, the present disclosure contemplates providing one or more shared RF filtering elements in an RF front end module, where a shared RF filtering element is an RF filtering element with a filter pass band that encompasses at least two operating bands and thus in a first operating configuration isolates signals within a first operating band and in a second operating configuration isolates signals within a second operating band that is different from the first operating band. In other words, a shared RF filtering element is used to isolate signals in two different operating bands during different operating configurations of the RF front end module.

Figure 2:
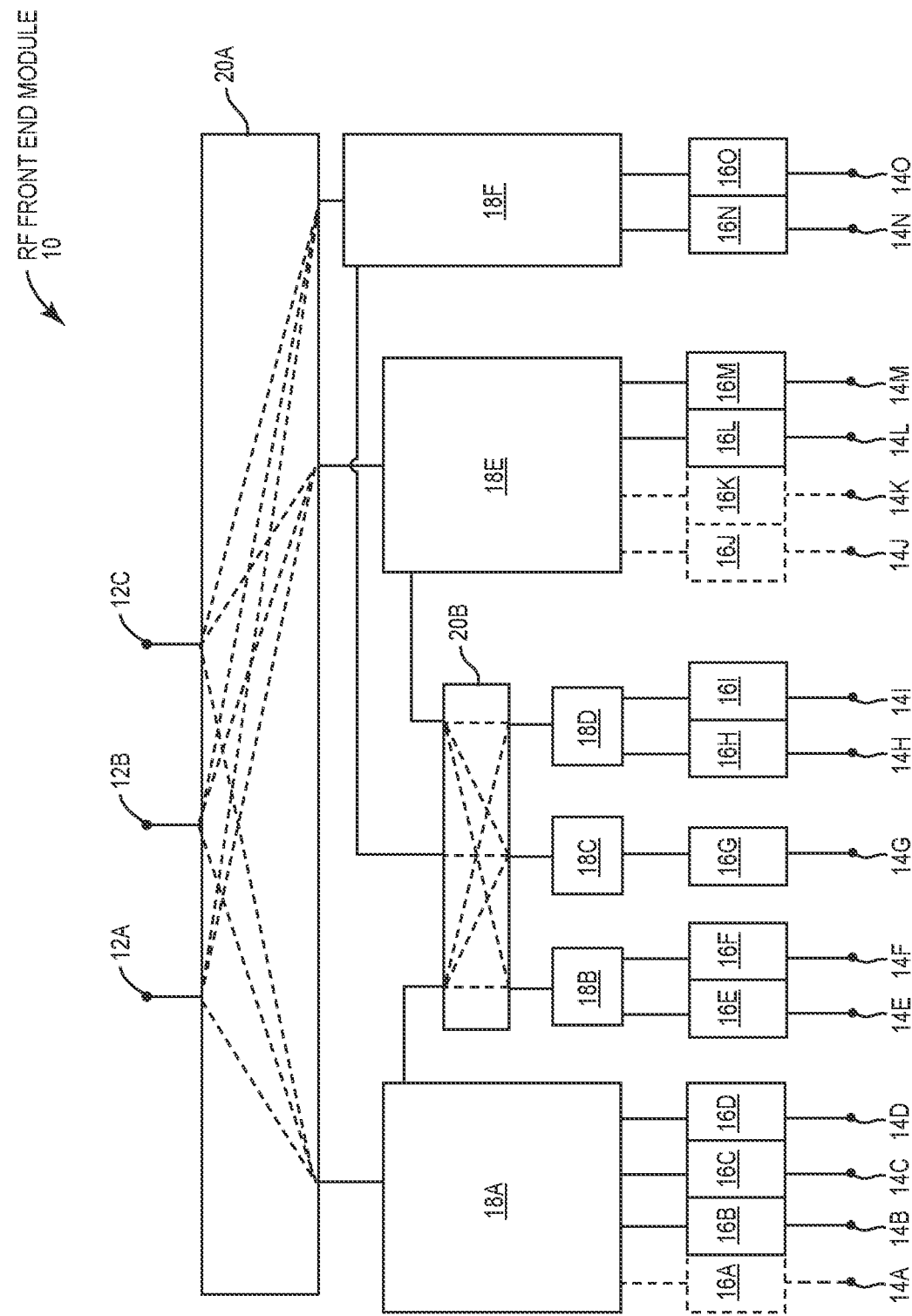
FIG. 2 is a functional schematic illustrating an RF front end module according to one embodiment of the present disclosure.

To illustrate these concepts, FIG. 2 shows an RF front end module 10 according to an additional embodiment of the present disclosure. Similar to the RF front end module 10 shown in FIG. 1, the RF front end module 10 includes antenna nodes 12, IO nodes 14, RF filtering elements 16, matching circuitry 18, and switching circuitry 20. However, the configuration of these elements is different in the RF front end module 10 of FIG. 2 in order to reduce the size thereof. In particular, a first RF filtering element 16A is coupled between a first IO node 14A and first matching circuitry 18A. A second RF filtering element 16B is coupled between a second IO node 14B and the first matching circuitry 18A. A third RF filtering element 16C is coupled between a third IO node 14C and the first matching circuitry 18A. A fourth RF filtering element 16D is coupled between a fourth IO node 14D and the first matching circuitry 18A. A fifth RF filtering element 16E is coupled between a fifth IO node 14E and second matching circuitry 18B. A sixth RF filtering element 16F is coupled between a sixth IO node 14F and the second matching circuitry 18B. A seventh RF filtering element 16G is coupled between a seventh IO node 14G and third matching circuitry 18C. An eighth RF filtering element 16H is coupled between an eighth IO node 14H and fourth matching circuitry 18D. A ninth RF filtering element 16I is coupled between a ninth IO node 14I and the fourth matching circuitry 18D. A tenth RF filtering element 16J is coupled between a tenth IO node 14J and fifth matching circuitry 18E. An eleventh RF filtering element 16K is coupled between an eleventh IO node 14K and the fifth matching circuitry 18E. A twelfth RF filtering element 16L is coupled between a twelfth IO node 14L and the fifth matching circuitry 18E. A thirteenth RF filtering element 16M is coupled between a thirteenth IO node 14M and the fifth matching circuitry 18E. A fourteenth RF filtering element 16N is coupled between a fourteenth IO node 14N and sixth matching circuitry 18F. A fifteenth RF filtering element 16O is coupled between a fifteenth IO node 14O and the sixth matching circuitry 18F. The first matching circuitry 18A, the fifth matching circuitry 18E, and the sixth matching circuitry 18F are coupled to first switching circuitry 20A. The second matching circuitry 18B, the third matching circuitry 18C, and the fourth matching circuitry 18D are coupled to the first switching circuitry 20A via second switching circuitry 20B. A first antenna node 12A, a second antenna node 12B, and the third antenna node 12C are coupled to the first switching circuitry 20A such that the first switching circuitry 20A is between the antenna nodes 12 and the matching circuitry 18.

The RF front end module 10 operates similar to that discussed above with respect to FIG. 1 wherein each one of the RF filtering elements 16 is configured to pass signals within a filter pass band while attenuating signals outside of the filter pass band. The matching circuitry 18 is configured to match impedances between each one of the RF filtering elements 16 coupled thereto such that each one of the RF filtering elements 16 can provide the filtering function discussed above. The switching circuitry 20 is configured to selectively couple various ones of the matching circuitry 18, and thus the RF filtering elements 16 to different ones of the antenna nodes 12 in order to simultaneously transmit and/or receive signals within one or more operating bands. In particular, signals within different operating bands received at one or more of the antenna nodes 12 are isolated by the coupled RF filtering elements 16 and separately provided to different ones of the IO nodes 14. Similarly, signals within different operating bands provided at different ones of the IO nodes 14 are combined and passed to one or more of the antenna nodes 12 for transmission.

Table 2 shows an exemplary configuration for the RF filtering elements 16 of the RF front end module 10. In particular, Table 2 shows the LTE operating band serviced by each one of the RF filtering elements 16 and the corresponding filter pass band:

TABLE 2

| RF filtering element | LTE Operating Band | Filter Pass Band (MHz) |
| --- | --- | --- |
| 16A | 32R | 1452-1496 |
| 16B | 1T | 1920-1980 |
| 16C | 3R | 1805-1880 |
| 16D | 40TR | 2300-2400 |

TABLE 2-continued

| RF filtering element | LTE Operating Band | Filter Pass Band (MHz) |
| --- | --- | --- |
| 16E | 3T/66T | 1710-1785 |
| 16F | 66R/1R | 2110-2200 |
| 16G | 41TR | 2496-2690 |
| 16H | 7T | 2500-2570 |
| 16I | 7R | 2620-2690 |
| 16J | 30T | 2305-2315 |
| 16K | 30R | 2350-2360 |
| 16L | 25T | 1850-1915 |
| 16M | 25R | 1930-1995 |
| 16N | 34TR | 2010-2025 |
| 16O | 39TR | 1880-1920 |

In some embodiments, the first RF filtering element 16A may be extended to cover band 75R and band 76R (e.g., down to 1427 MHz and up to 1517 MHz). As shown, the fifth RF filtering element 16E and the sixth RF filtering element 16F are shared between band 3T-band 66T and band 66R-B1R respectively, since these bands are overlapping. In a first operating configuration, the switching circuitry 20 couples the fifth RF filtering element 16E and the sixth RF filtering element 16F to one or more of the antenna nodes 12 along with one or more other RF filtering elements 16 in order to transmit and/or receive signals within band 3T and 1R and one or more other bands. In a second operating configuration, the switching circuitry 20 couples the fifth RF filtering element 16E and the sixth RF filtering element 16F to one or more of the antenna nodes along with one or more other RF filtering elements 16 in order to transmit and/or receive signals within band 66 and one or more other bands. The RF front end module 10 shown in FIG. 2 is capable of the same carrier aggregation configurations as its counterpart in FIG. 1 (i.e., B1-B3-B41, B1-B3-B7, B25-B66-B41, B25-B66-B7, B1-B3-B40, and B7-B40, and other carrier aggregation configurations not mentioned), but with less RF filtering elements 16. This results in a significant reduction in space consumed by the RF front end module 10. The fifth RF filtering element 16E and the sixth RF filtering element 16F, which form a duplexer as shown, can be coupled to the quadplexer formed by the first RF filtering element 16A, the second RF filtering element 16B, the third RF filtering element 16C, and the fourth RF filtering element 16D or to the quadplexer formed by the tenth RF filtering element 16J, the eleventh RF filtering element 16K, the twelfth RF filtering element 16L and the thirteenth RF filtering element 16M to form two different virtual hexaplexers, each of which may be coupled to one or more of the antenna nodes 12 in different operating configurations in order to realize carrier aggregation within different groups of bands.

In addition to the use of two shared RF filtering elements, by increasing the available switching routes in the second switching circuitry 20B the seventh RF filtering element 16G can be coupled with the fourteenth RF filtering element 16N and the fifteenth RF filtering element 16O to form a virtual triplexer, which can be coupled to one or more of the antenna nodes to perform the same function as the sixteenth through eighteenth RF filtering elements 16P-16R in FIG. 1, or can be coupled with other groups of RF filtering elements 16 to serve the same function as seventh RF filtering element 16G in FIG. 1, thereby saving an additional filter. The result is the elimination of three RF filtering elements 16 from the RF front end module 10, thereby saving space and reducing the size thereof.

While a particular example for sharing RF filtering elements in order to save space in an RF front end module is discussed above with respect to FIG. 2, the present disclosure generally contemplates reusing an RF filtering element in different operating modes to filter signals in different operating bands in order to save space and reduce size. The switching circuitry 20 is adjusted in order to allow more flexible connections between combinations of filters in order to realize a diverse number of carrier aggregation configurations in less space. Notably, the matching circuitry 18 must be designed appropriately to be capable of matching impedances between all combinations of switchable multiplexers including virtual diplexers, triplexers, quadplexers, hexaplexers, etc. that can be provided by the switching circuitry 20. Further, the switching circuitry 20 must be redesigned to allow more flexible connections between various groups of the RF filtering elements 16.

Figure 3:
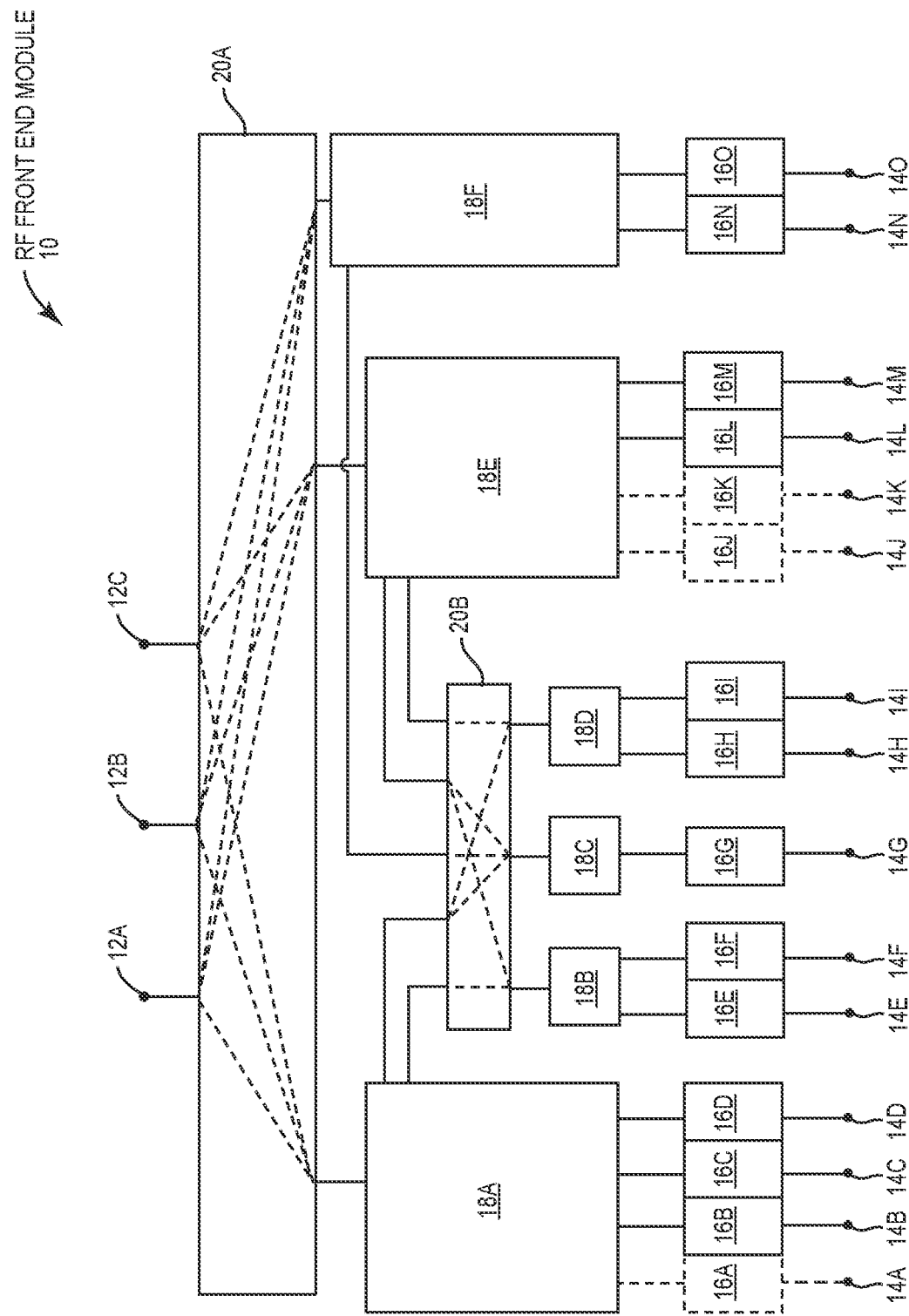
FIG. 3 is a functional schematic illustrating an RF front end module according to one embodiment of the present disclosure.

FIG. 3 shows the RF front end module 10 according to an additional embodiment of the present disclosure. The RF front end module 10 shown in FIG. 3 is substantially similar to that shown in FIG. 2, except for the configuration of the second switching circuitry 20B, which includes additional switching paths to allow for connecting the diplexer formed by the fifth RF filtering element 16E and the sixth RF filtering element 16F along with one of the seventh RF filtering element 16G or the diplexer formed by the eighth RF filtering element 16H and the ninth RF filtering element 16I to either one of the quadplexer formed by the first RF filtering element 16A, the second RF filtering element 16B, the third RF filtering element 16C, and the fourth RF filtering element 16D or to the quadplexer formed by the tenth RF filtering element 16J, the eleventh RF filtering element 16K, the twelfth RF filtering element 16L and the thirteenth RF filtering element 16M through dedicated paths. Modifying the second switching circuitry 20B as shown may increase matching flexibility by providing dedicated paths between the fifth through eighth RF filtering elements 16E-16I to the second switching circuitry 20B and thus increase performance, or may otherwise provide different performance trade-offs that have positive impacts in some operating bands. The RF filtering elements 16 shown in FIG. 3 will operate in a substantially similar way to those describe in FIG. 2 and thus Table 2 applies to FIG. 3 as well.

Figure 4:
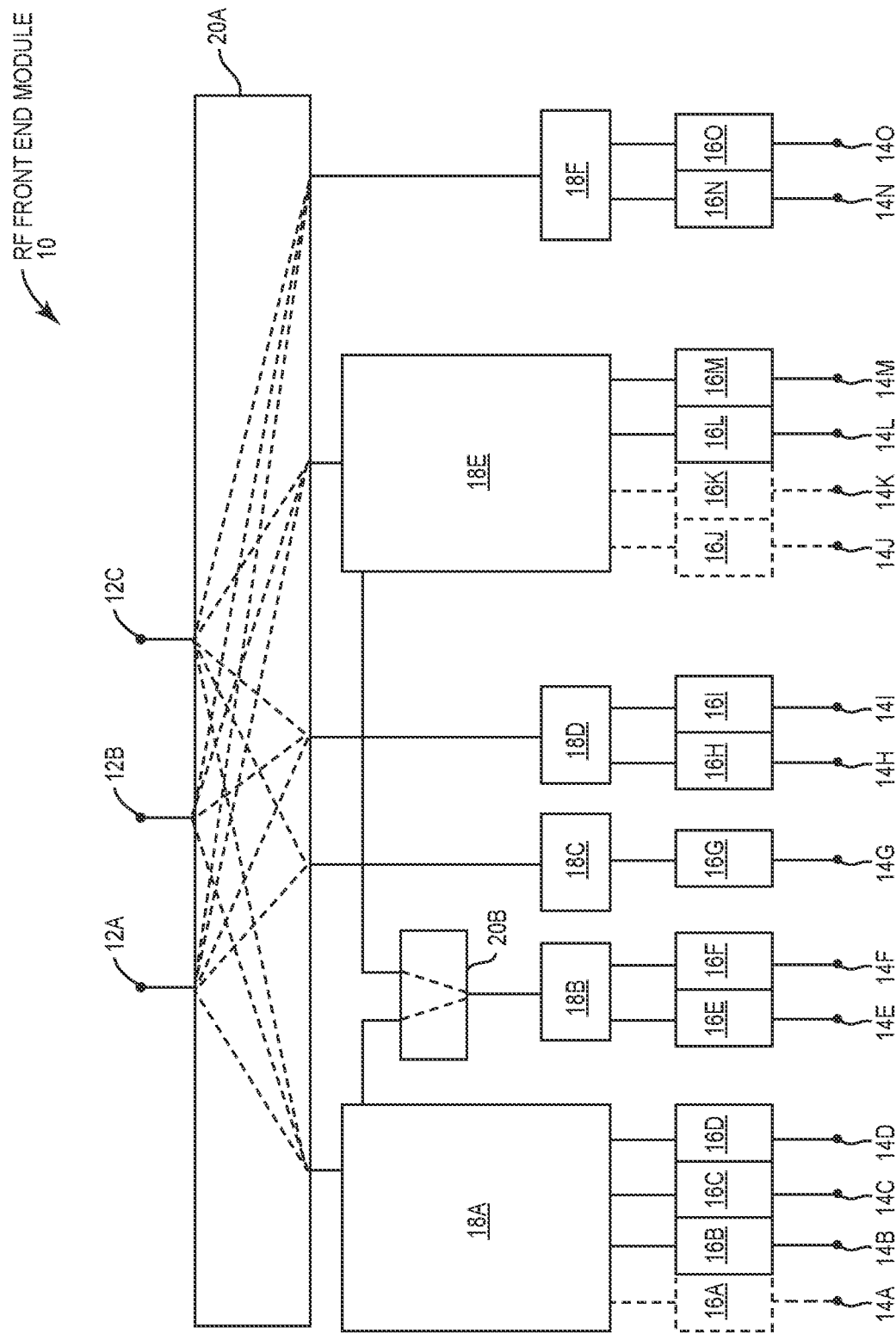
FIG. 4 is a functional schematic illustrating an RF front end module according to one embodiment of the present disclosure.

FIG. 4 shows the RF front end module 10 according to an additional embodiment of the present disclosure. The RF front end module 10 shown in FIG. 4 is substantially similar to that shown in FIG. 2 except that some of the switching paths enabled by the second switching circuitry 20B in FIG. 2 are instead provided by the first switching circuitry 20A, which includes additional switching paths for the seventh RF filtering element 16G and the diplexer formed by the eighth RF filtering element 16H and the ninth RF filtering element 16I. These additional switching paths can be turned on depending on the configuration either alone or, for example, in the case of carrier aggregations together with the switching path for the quadplexer formed by the first RF filtering element 16A, the second RF filtering element 16B, the third RF filtering element 16C, and the fourth RF filtering element 16D or the switching path for the quadplexer formed by the tenth RF filtering element 16J, the eleventh RF filtering element 16K, the twelfth RF filtering element 16L and the thirteenth RF filtering element 16M or the switching path for the diplexer formed by the fourteenth RF filtering element 16N and the fifteenth RF filtering element 16O to form a switched multiplexer. The diplexer formed by the fifth RF filtering element 16E and the sixth RF filtering element 16F can at the same time depending on the configuration either be switched to the first mentioned quadplexer or to the second mentioned quadplexer or neither of them using the second switching circuitry 20B similar to that discussed above with respect to FIG. 2. This may provide different trade-offs for performance that have positive impacts in some operating bands. The RF filtering elements 16 shown in FIG. 4 will operate in a substantially similar way to those describe in FIG. 2 and thus Table 2 applies to FIG. 4 as well.

Figure 5:
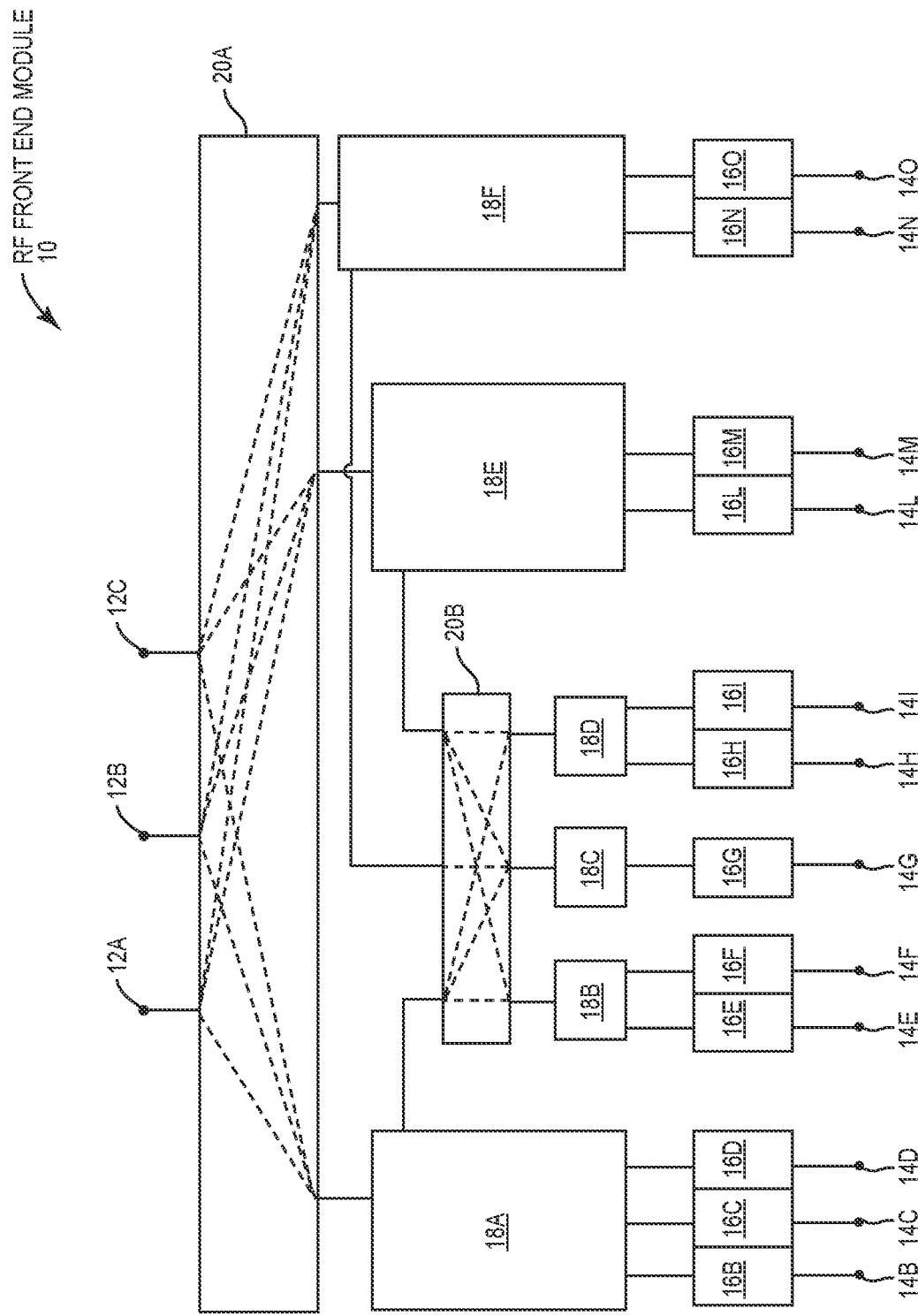
FIG. 5 is a functional schematic illustrating an RF front end module according to one embodiment of the present disclosure.

FIG. 5 shows the RF front end module 10 according to an additional embodiment of the present disclosure. The RF front end module 10 shown in FIG. 5 is substantially similar to that shown in FIG. 2, except that the first RF filtering element 16A, the tenth RF filtering element 16J, and the eleventh RF filtering element 16K are omitted. Those skilled in the art will appreciate that the operating bands supported by these RF filtering elements (band 32R (and optionally bands 75R and 76R), band 30T, and band 30R) are regional bands that may not be used in all applications. Therefore, in order to simplify the RF front end module 10 these RF filtering elements 10 can be omitted to achieve a smaller solution. The RF filtering elements 16 shown in FIG. 5 will operate in a substantially similar way to those describe in FIG. 2 and thus Table 2 applies to FIG. 5 as well.

Figure 6:
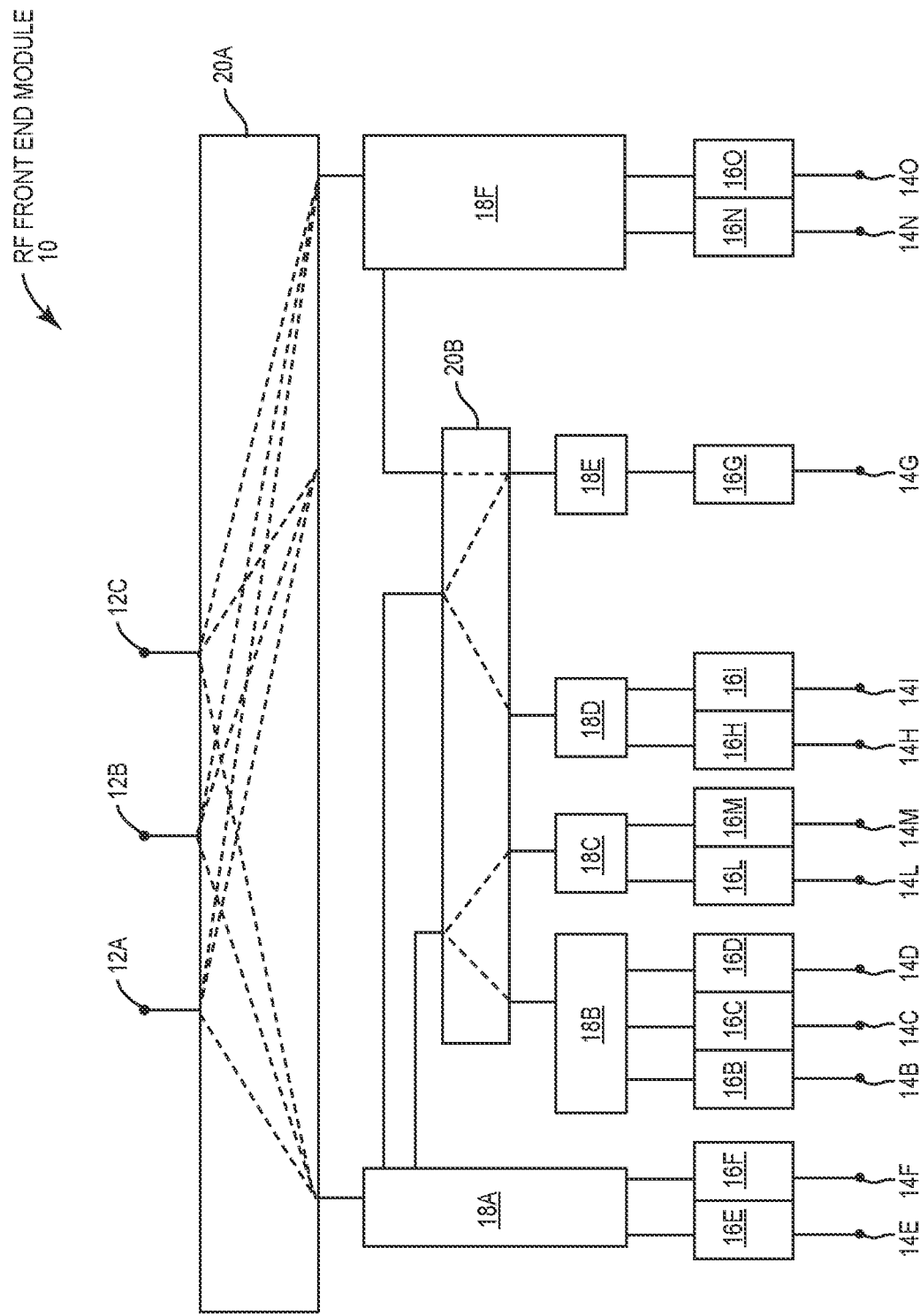
FIG. 6 is a functional schematic illustrating an RF front end module according to one embodiment of the present disclosure.

With this smaller solution, the secondary switching circuitry 20B may be reconfigured as illustrated in FIG. 6, which shows the RF front end module 10 according to an additional embodiment of the present disclosure. The RF front end module 10 shown in FIG. 6 is substantially similar to that shown in FIG. 5, except that the allowed switching paths in the second switching circuitry 20B are reconfigured. This switching architecture will support the same operating configurations and thus carrier aggregation configurations as the RF front end module 10 shown in FIG. 5. The RF filtering elements 16 shown in FIG. 6 will operate in a substantially similar way to those describe in FIG. 2 and thus Table 2 applies to FIG. 6 as well.

Figure 7:
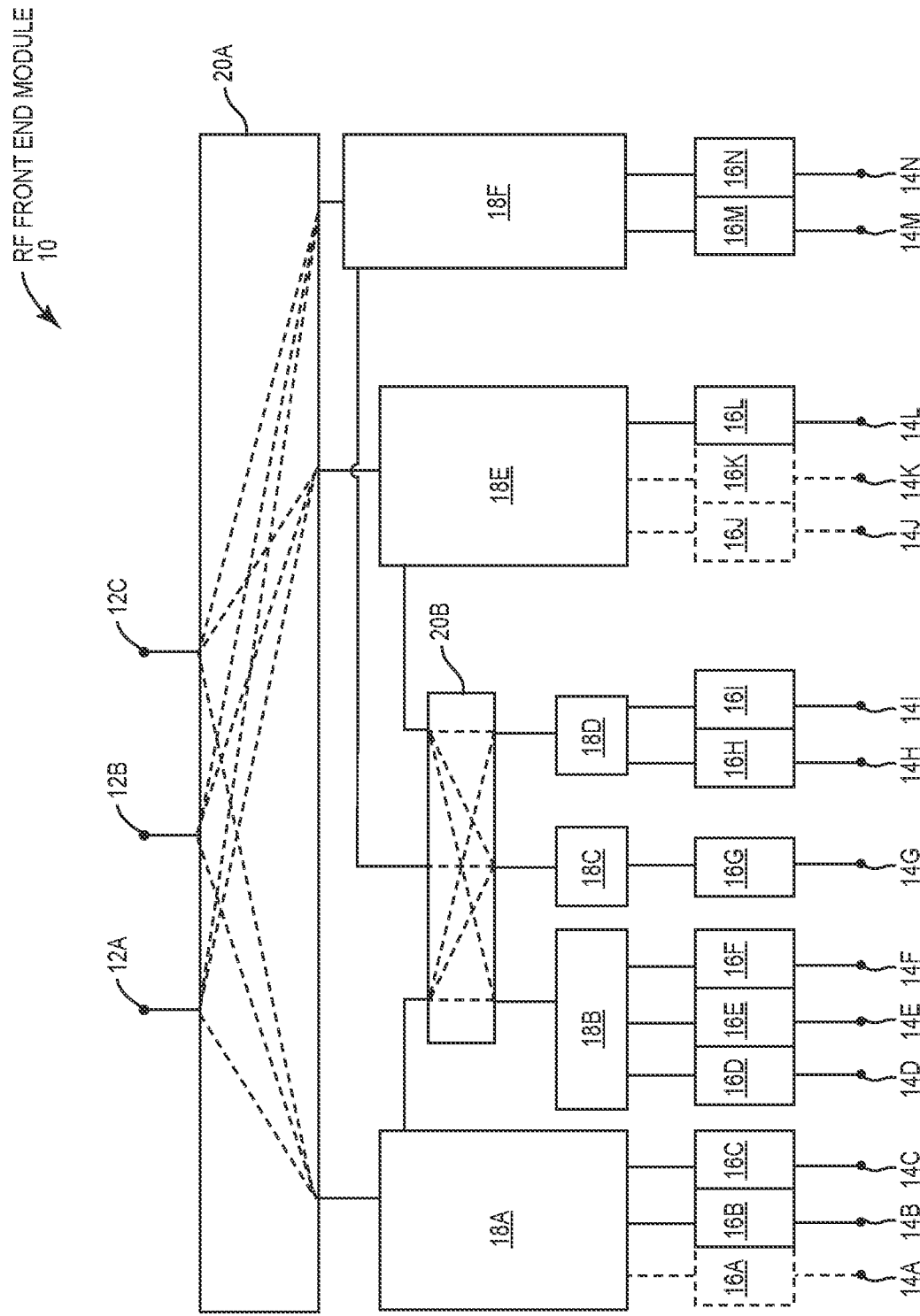
FIG. 7 is a functional schematic illustrating an RF front end module according to one embodiment of the present disclosure.

As discussed above, the present disclosure contemplates reusing RF filtering elements between different operating bands in different operating configurations. In addition to the overlap noted above with respect to band 3T and band 66T as well as band 1R and band 66R, there is also an overlap between band 1T and band 25R. FIG. 7 thus shows the RF front end module 10 according to an additional embodiment of the present disclosure. Similar to the RF front end module 10 shown in FIG. 1, the RF front end module 10 includes antenna nodes 12, IO nodes 14, RF filtering elements 16, matching circuitry 18, and switching circuitry 20. However, the configuration of these elements is different in the RF front end module 10 of FIG. 7 in order to further reduce the size thereof. In particular, a first RF filtering element 16A is coupled between a first IO node 14A and first matching circuitry 18A. A second RF filtering element 16B is coupled between a second IO node 14B and the first matching circuitry 18A. A third RF filtering element 16C is coupled between a third IO node 14C and the first matching circuitry 18A. A fourth RF filtering element 16D is coupled between a fourth IO node 14D and second matching circuitry 18B. A fifth RF filtering element 16E is coupled between a fifth IO node 14E and the second matching circuitry 18B. A sixth RF filtering element 16F is coupled between a sixth IO node 14F and the second matching circuitry 18B. A seventh RF filtering element 16G is coupled between a seventh IO node 14G and third matching circuitry 18C. An eighth RF filtering element 16H is coupled between an eighth IO node 14H and fourth matching circuitry 18D. A ninth RF filtering element 16I is coupled between a ninth IO node 14I and the fourth matching circuitry 18D. A tenth RF filtering element 16J is coupled between a tenth IO node 14J and fifth matching circuitry 18E. An eleventh RF filtering element 16K is coupled between an eleventh IO node 14K and the fifth matching circuitry 18E. A twelfth RF filtering element 16L is coupled between a twelfth IO node 14L and the fifth matching circuitry 18E. A thirteenth RF filtering element 16M is coupled between a thirteenth IO node 14M and sixth matching circuitry 18F. A fourteenth RF filtering element 16N is coupled between a fourteenth IO node 14N and the sixth matching circuitry 18F. The first matching circuitry 18A, the fifth matching circuitry 18E, and the sixth matching circuitry 18F are coupled to first switching circuitry 20A. The second matching circuitry 18B, the third matching circuitry 18C, and the fourth matching circuitry 18D are coupled to the first switching circuitry 20A via the second switching circuitry 20B. A first antenna node 12A, a second antenna node 12B, and a third antenna node 12C are coupled to the first switching circuitry 20A such that the first switching circuitry 20A and the second switching circuitry 20B is between the antenna nodes 12 and the matching circuitry 18.

The RF front end module 10 operates similar to that discussed above with respect to FIG. 2 wherein each one of the RF filtering elements 16 is configured to pass signals within a filter pass band while attenuating signals outside of the filter pass band. The matching circuitry 18 is configured to match impedances between each one of the RF filtering elements 16 coupled thereto such that each one of the RF filtering elements 16 can provide the filtering function discussed above. The switching circuitry 20 is configured to selectively couple various ones of the matching circuitry 18, and thus the RF filtering elements 16 to different ones of the antenna nodes 12 in order to simultaneously transmit and/or receive signals within one or more operating bands. In particular, signals within different operating bands received at one or more of the antenna nodes 12 are isolated by the coupled RF filtering elements 16 and separately provided to different ones of the IO nodes 14. Similarly, signals within different operating bands provided at different ones of the IO nodes 14 are combined and passed to one or more of the antenna nodes 12 for transmission.

Table 3 shows an exemplary configuration for the RF filtering elements 16 of the RF front end module 10. In particular, Table 3 shows the LTE operating band serviced by each one of the RF filtering elements 16 and the corresponding filter pass band:

TABLE 3

| RF filtering element | LTE Operating Band | Filter Pass Band (MHz) |
|---|---|---|
| 16A | 32R | 1452-1496 |
| 16B | 3R | 1805-1880 |
| 16C | 40TR | 2300-2400 |
| 16D | 1T/25R | 1920-1995 |
| 16E | 3T/66T | 1710-1785 |
| 16F | 66R/1R | 2110-2200 |
| 16G | 41TR | 2496-2690 |
| 16H | 7T | 2500-2570 |
| 16I | 7R | 2620-2690 |
| 16J | 30T | 2305-2315 |
| 16K | 30R | 2350-2360 |
| 16L | 25T | 1850-1915 |
| 16M | 34TR | 2010-2025 |
| 16N | 39TR | 1880-1920 |

As shown, the fourth RF filtering element 16D is shared between band 1 and band 25 (transmit and receive, respectively). This can be accomplished by providing the fourth RF filtering element 16D with a slightly wider filter pass band that it would otherwise have if being used individually for either one of these operating bands. Combining these previously separate RF filtering elements 16 into a single shared RF filtering element 16 allows for a further reduction in space while supporting the same carrier aggregation configurations as its counterpart in FIG. 2 (i.e., B1-B3-B41, B1-B3-B7, B25-B66-B41, B25-B66-B7, B1-B3-B40, and B7-B40, and other carrier aggregation configurations not mentioned). As discussed above, the present disclosure contemplates using a single RF filtering element for different operating bands in different operating configurations when the operating bands are close enough in frequency to allow for doing so. For example, while a schematic is not shown illustrating this concept, a single RF filtering element 16 could be provided to isolate signals in band 3 in a first operating configuration and band 25 in a second operating configuration (receive and transmit, respectively).

Figure 8:
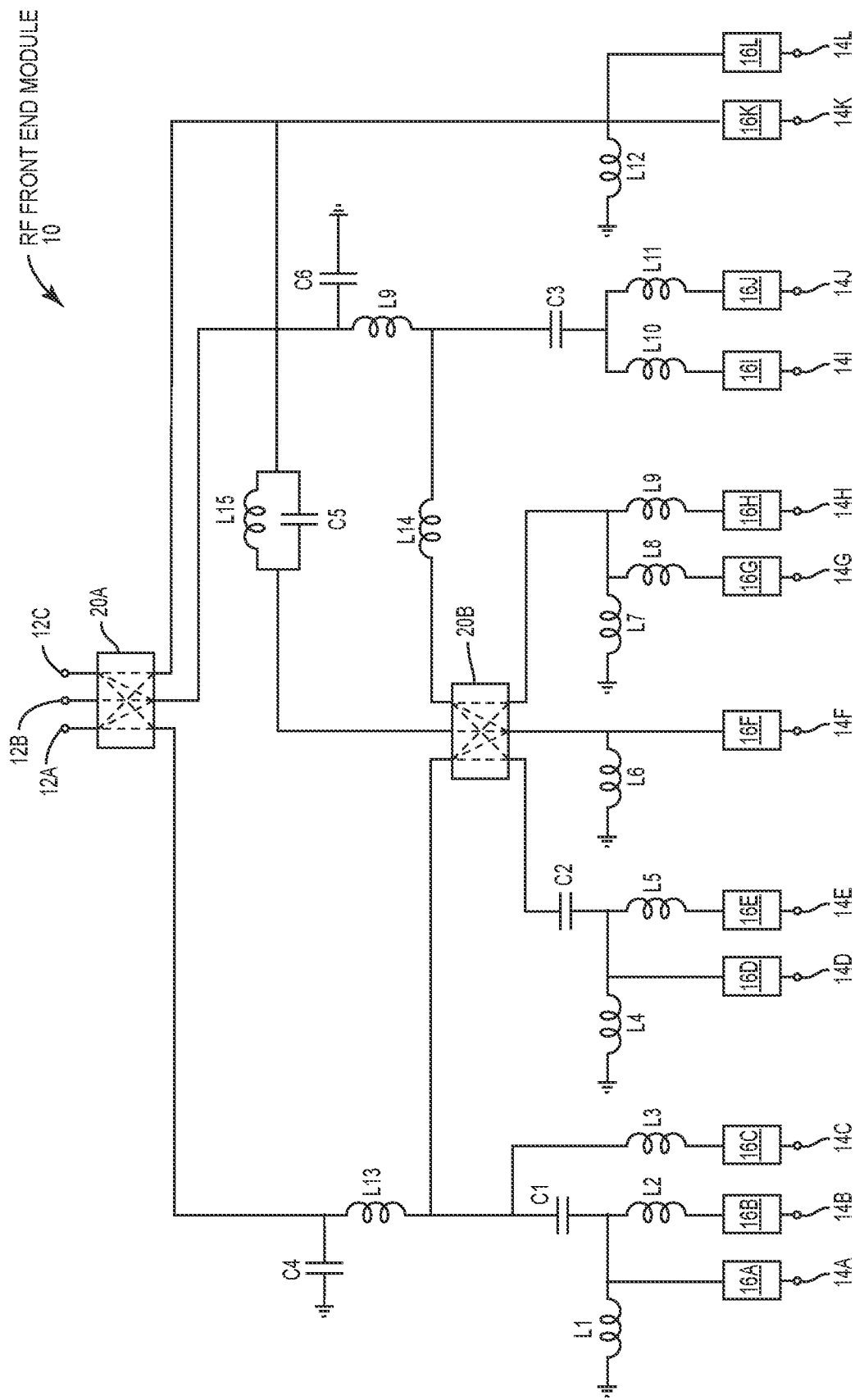
FIG. 8 is a functional schematic illustrating an RF front end module according to one embodiment of the present disclosure.

FIG. 8 shows the RF front end module 10 including details of the matching circuitry 18 according to one embodiment of the present disclosure. The RF front end module 10 is similar to that shown in FIG. 5, but with the details of the matching circuitry 18 shown. As shown, the matching circuitry 18 includes a number of matching capacitors C and matching inductors L arranged between the RF filtering elements 16 and the switching circuitry 20 to provide the matching circuitry 18. The matching capacitors C and the matching inductors L are arranged and their values for capacitance and inductance, respectively, are chosen such that for each operating configuration of the RF front end module 10 wherein various ones of the RF filtering elements 16 are coupled to one or more of the antenna nodes 12, the impedance of the coupled RF filtering elements 16 is matched in order for each of the RF filtering elements 16 to pass signals within their filter pass band and attenuate signals outside of their filter pass band. Notably, the matching circuitry 18 must be capable of doing this for several different combinations of connections between the various groups of RF filtering elements 16. The arrangement of the matching capacitors C and matching inductors L shown in FIG. 8 is one way to achieve this result. However, the present disclosure is not so limited and contemplates any suitable arrangement of matching capacitors C and matching inductors L in order to accomplish the same. Notably, distributed matching elements and interconnections are not shown in FIG. 8 since they provide generic RF matching. The RF filtering elements shown in FIG. 8 will provide the same functionality as in FIG. 5 and thus Table 2 applies to FIG. 8 as well.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:
1. A radio frequency (RF) front end module comprising:
an antenna node;
a plurality of RF filtering elements, each of the plurality of RF filtering elements configured to:
pass RF signals within a filter pass band; and
attenuate RF signals outside of the filter pass band;
an impedance matching network configured to match an impedance of different RF filtering elements of the plurality of RF filtering elements to one another, the impedance matching network including shared impedance matching elements; and switching circuitry configured to selectively couple one or more of the plurality of RF filtering elements to the antenna node such that RF signals in different operating bands at the antenna node are separately isolated by the one or more of the plurality of RF filtering elements, wherein:

the plurality of RF filtering elements includes a shared RF filtering element coupled with the shared impedance matching elements to provide impedance matching for the shared RF filtering element exclusive of other RF filtering elements of the plurality of RF filtering elements; and the switching circuitry and the plurality of RF filtering elements are configured such that in a first operating configuration the shared RF filtering element is coupled to the antenna node and configured to isolate signals within a first operating band at the antenna node and in a second operating configuration the shared RF filtering element is coupled to the antenna node and configured to isolate signals within a second operating band at the antenna node.

2. The RF front end module of claim 1 wherein the switching circuitry is further configured to:

in the first operating configuration, couple a first set of the plurality of RF filtering elements to the antenna node; and in the second operating configuration, couple a second set of the plurality of RF filtering elements to the antenna node, wherein:

the first set of RF filtering elements and the second set of RF filtering elements include the shared RF filtering element, which is configured to pass RF signals within a shared filter pass band between the antenna node and a shared input-output node and attenuate RF signals outside the shared filter pass band;

the shared filter pass band includes the first operating band and the second operating band;

in the first operating configuration, RF signals within the first operating band are passed from the antenna node to the shared input-output node; and in the second operating configuration, RF signals within the second operating band are passed from the antenna node to the shared input-output node.

3. The RF front end module of claim 2 wherein the first operating configuration and the second operating configuration are carrier aggregation configurations in which RF signals in multiple operating bands are simultaneously transmitted and/or received at the antenna node.

4. The RF front end module of claim 2 wherein:

the first set of the plurality of RF filtering elements includes a first exclusive RF filtering element, which is configured to pass RF signals within a third operating band from the antenna node to a first exclusive input/output node and attenuate RF signals outside the third operating band; and the second set of the plurality of RF filtering elements includes a second exclusive RF filtering element, which is configured to pass RF signals within a fourth operating band from the antenna node to a second exclusive input/output node and attenuate RF signals outside the fourth operating band.

5. The RF front end module of claim 2 wherein each one of the plurality of RF filtering elements is an acoustic filtering device.

6. The RF front end module of claim 5 wherein each one of the plurality of RF filtering elements is one of a surface acoustic wave (SAW) device and a bulk acoustic wave (BAW) device.

7. The RF front end module of claim 2 wherein the impedance matching network is configured to:

in the first operating configuration, match an impedance of the first set of RF filtering elements to one another; and in the second operating configuration, match an impedance of the second set of RF filtering elements to one another.

8. The RF front end module of claim 2 wherein:

the plurality of RF filtering elements includes an additional shared RF filtering element; and the switching circuitry and the plurality of RF filtering elements are configured such that in a third operating configuration the additional shared RF filtering element is configured to isolate signals within a third operating band received at the antenna node and in a fourth operating configuration the additional shared filtering elements is configured to isolate signals within a fourth operating band received at the antenna node.

9. The RF front end module of claim 1 wherein each one of the plurality of RF filtering elements is an acoustic filtering device.

10. The RF front end module of claim 9 wherein each one of the plurality of RF filtering elements is one of a surface acoustic wave (SAW) device and a bulk acoustic wave (BAW) device.

11. The RF front end module of claim 1 wherein the impedance matching network further comprises distributed impedance matching elements providing generic RF matching for the plurality of RF filtering elements.

12. The RF front end module of claim 1 wherein:

the plurality of RF filtering elements includes an additional shared RF filtering element; and the switching circuitry and the plurality of RF filtering elements are configured such that in a third operating configuration the additional shared RF filtering element is configured to isolate signals within a third operating band received at the antenna node and in a fourth operating configuration the additional shared RF filtering element is configured to isolate signals within a fourth operating band received at the antenna node.

13. The RF front end module of claim 1 further comprising an additional antenna node, wherein the switching circuitry is configured to selectively couple one or more of the plurality of RF filtering elements to one or more of the antenna node and the additional antenna node such that RF signals in different operating bands received at the one or more of the antenna node and the additional antenna node are separately isolated by the one or more of the plurality of RF filtering elements.

14. The RF front end module of claim 1, wherein the shared impedance matching elements comprise at least one inductor and at least one capacitor.

15. A method for isolating radio frequency (RF) signals in different operating bands, the method comprising:

in a first operating configuration, coupling a first set of a plurality of RF filtering elements to an antenna node, and matching an impedance of the first set of RF filtering elements to one another; and in a second operating configuration, coupling a second set of the plurality of RF filtering elements to the antenna node, and matching an impedance of the second set of RF filtering elements to one another, wherein:

the first set of RF filtering elements and the second set of RF filtering elements include a shared RF filtering element, which is configured to pass RF signals within a shared filter pass band between the antenna node and a first input-output node and attenuate RF signals outside the shared filter pass band;

the shared filter pass band includes at least a first operating band and a second operating band;

impedance matching is performed with an impedance matching network that comprises shared impedance matching elements coupled with the shared RF filtering element and configured to provide impedance matching for the shared RF filtering element exclusive of other RF filtering elements of the plurality of RF filtering elements;

in the first operating configuration, RF signals within the first operating band are passed between the antenna node and the first input-output node; and in the second operating configuration, RF signals within the second operating band are passed between the antenna node and the first input-output node.

16. The method of claim 15 wherein:

the first set of the plurality of RF filtering elements includes a first exclusive RF filtering element, which is configured to pass RF signals within a third operating band from the antenna node to a first exclusive input/output node and attenuate RF signals outside the third operating band; and the second set of the plurality of RF filtering elements includes a second exclusive RF filtering element, which is configured to pass RF signals within a fourth operating band from the antenna node to a second exclusive input/output node and attenuate RF signals outside the fourth operating band.

17. The method of claim 15 wherein each one of the plurality of RF filtering elements is an acoustic filtering device.

18. The method of claim 17 wherein each one of the plurality of RF filtering elements is one of an acoustic surface wave (SAW) device and a bulk acoustic wave (BAW) device.

19. The method of claim 15 wherein the first operating configuration and the second operating configuration are carrier aggregation configurations in which RF signals in multiple operating bands are simultaneously received at the antenna node.

20. The method of claim 15 wherein:

in the first operating configuration, the first set of the plurality of RF filtering elements is coupled to one of the antenna node and an additional antenna node; and in the second operating configuration, the second set of the plurality of RF filtering elements is coupled to one of the antenna node and the additional antenna node.

* * * * *